(12) United States Patent
Kobayashi et al.

(10) Patent No.: US 8,089,954 B2
(45) Date of Patent: Jan. 3, 2012

(54) IP TELEPHONE SYSTEM, IP TELEPHONE APPARATUS AND COMMUNICATIONS METHOD

(75) Inventors: Kazuto Kobayashi, Kanagawa (JP); Akira Miyajima, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1410 days.

(21) Appl. No.: 11/150,111

(22) Filed: Jun. 13, 2005

(65) Prior Publication Data
US 2006/0018311 A1 Jan. 26, 2006

(30) Foreign Application Priority Data
Jul. 20, 2004 (JP) ................ P2004-211618

(51) Int. Cl.
*H04L 12/66* (2006.01)
(52) U.S. Cl. ........ 370/352; 370/353; 370/354; 370/355; 370/356; 370/466
(58) Field of Classification Search ............ 370/352
See application file for complete search history.

(56) References Cited

U.S. PATENT DOCUMENTS

| | | | | |
|---|---|---|---|---|
| 6,157,636 | A * | 12/2000 | Voit et al. | 370/353 |
| 6,292,478 | B1 * | 9/2001 | Farris | 370/352 |
| 6,324,264 | B1 * | 11/2001 | Wiener et al. | 379/88.22 |
| 6,347,085 | B2 * | 2/2002 | Kelly | 370/352 |
| 6,359,880 | B1 * | 3/2002 | Curry et al. | 370/352 |
| 6,373,817 | B1 * | 4/2002 | Kung et al. | 370/217 |
| 6,542,489 | B1 | 4/2003 | Kari et al. | |
| 6,687,242 | B1 | 2/2004 | Enzmann et al. | |
| 6,785,266 | B2 * | 8/2004 | Swartz | 370/352 |
| 6,873,849 | B2 * | 3/2005 | de la Red et al. | 455/445 |
| 6,917,612 | B2 * | 7/2005 | Foti et al. | 370/352 |
| 6,920,208 | B1 * | 7/2005 | Rosen et al. | 379/126 |
| 7,660,898 | B2 * | 2/2010 | Mueller et al. | 709/227 |
| 2001/0055299 | A1 * | 12/2001 | Kelly | 370/352 |
| 2002/0099814 | A1 * | 7/2002 | Mastrianni | 709/224 |

(Continued)

FOREIGN PATENT DOCUMENTS

| | | |
|---|---|---|
| EP | 0869688 | 10/1999 |
| JP | 2002-290567 | 10/2002 |
| KR | 2004-0028333 | 4/2004 |
| WO | 03/056732 | 7/2003 |

OTHER PUBLICATIONS

Network Working Group M. Mealling R. Daniel Request for Comments: 2915 Updates: 2168 Sep. 2000.*

(Continued)

*Primary Examiner* — Joe Cheng
*Assistant Examiner* — Wutchung Chu
(74) *Attorney, Agent, or Firm* — Greenblum & Bernstein, P.L.C.

(57) ABSTRACT

An IP telephone system includes a source IP telephone apparatus, a Web server and an ENUM server. The source IP telephone apparatus is connected to an IP network. The Web server stores predetermined information regarding a user of the source IP telephone apparatus and transmits, to a destination IP telephone apparatus, the predetermined information in response to a request from the destination IP telephone apparatus. The ENUM server stores a NAPTR resource record which includes a URI utilized for obtaining the predetermined information stored in the Web server. In the IP telephone system, the destination IP telephone apparatus transmits, to the ENUM server, a request for a NAPTR resource record of the source IP telephone apparatus and transmits, to the Web server, a request for the predetermined information regarding the source IP telephone apparatus according to the obtained NAPTR resource record.

20 Claims, 14 Drawing Sheets

U.S. PATENT DOCUMENTS

| | | | |
|---|---|---|---|
| 2003/0032432 A1* | 2/2003 | Red et al. | 455/445 |
| 2003/0081752 A1* | 5/2003 | Trandal et al. | 379/210.01 |
| 2003/0123488 A1 | 7/2003 | Riikonen et al. | |
| 2003/0154243 A1* | 8/2003 | Crockett et al. | 709/203 |
| 2003/0193486 A1* | 10/2003 | Estrop | 345/204 |
| 2004/0057421 A1* | 3/2004 | Kawabata et al. | 370/352 |
| 2004/0073658 A1* | 4/2004 | Oran et al. | 709/224 |
| 2004/0156394 A1* | 8/2004 | Westman | 370/471 |
| 2004/0162094 A1 | 8/2004 | Riikonen et al. | |
| 2005/0033852 A1* | 2/2005 | Tenhunen | 709/229 |
| 2005/0123114 A1* | 6/2005 | Trandal et al. | 379/201.01 |

OTHER PUBLICATIONS

Network Working Group, J. Rosenberg, et al Request for Comments: 3261, Obsoletes: 2543 Category: Standards Track, SIP: Session Initiation Protocol, Jun. 2002.*

Network Working Group T. Howes and M. Smith Request for Comments: 1959 Jun. 1996 An LDAP URL Format.*

ITU-T H.323 System Implementers Guide (May 30, 2003) Series H: Audiovisual and multimedia systems Infrastructure of audiovisual services—Communication procedures.*

Faltstrom, Cisco Systems Inc., "E. 164 number and DNS; rfc2916.txt," IETF Standard, Internet Engineering Task Force, IETF, CH, Sep. 2000 XP015008699.

Huston, "Implications of ENUM," Jul. 2003, XP002363539.

English Language Abstract of KR 2004-0028333.

A publication issued by ENUM Trial Japan "ENUM Trial Japan First Report", May 2004, together with a partial English language translation.

English Language Abstract of JP 2002-290567.

U.S. Appl. No. 11/150,117 to Kobayashi et al., filed Jun. 13, 2005.

U.S. Appl. No. 11/166,236 to Kobayashi et al., filed Jun. 27, 2005.

U.S. Appl. No. 11/150,119 to Kobayashi et al., filed Jun. 13, 2005.

* cited by examiner

Fig.5

| Enum domain name | | Order | Preference | Flags | Service | | URI scheme | |
|---|---|---|---|---|---|---|---|---|
| | | | | | | | | URI |
| 0.0.0.0.0.0.0.1.3.1.8.e164.arpa | IN NAPTR | 100 | 10 | "u" | "E2U+sip" | "!^.*$!sip:" | 81310000000@tokyo.sip.jp" | |
| | IN NAPTR | 100 | 10 | "u" | "E2U+http" | "!^.*$!http:" | //www.tokyo.sip.com/user81310000000.html" | |
| 1.0.0.0.0.0.0.1.3.1.8.e164.arpa | IN NAPTR | 100 | 10 | "u" | "E2U+sip" | "!^.*$!sip:" | 81310000001@tokyo.sip.jp" | |
| | IN NAPTR | 100 | 10 | "u" | "E2U+http" | "!^.*$!http:" | //www.tokyo.sip.com/user81310000001.html" | |

NAPTR resource record

Fig.6

| URI | IP address |
| --- | --- |
| 81310000000@tokyo.sip.jp | 192.168.1.1 |
| 81310000001@tokyo.sip.jp | 192.168.1.2 |
| 81310000002@tokyo.sip.jp | 192.168.1.3 |
| 81310000003@tokyo.sip.jp | 192.168.1.4 |

Fig.7

//www.tokyo.sip.com/user81310000000.html

```
<html>
<head>caller</head>
<body>
Matsushita Tarou
TEL:03-1000-0000
Address:Tokyo-to,meguro-ku
<img svc="tarou-matsushita.jpg" width="10",height="26">
</body>
</html>
```

//www.tokyo.sip.com/user81310000001.html

```
<html>
<head>caller</head>
<body>
Matsushita Hanako
TEL:03-1000-0001
Address:Tokyo-to,shinjuku-ku
<img svc="hanako-matsushita.jpg" width="10",height="26">
</body>
</html>
```

Fig.9

INVITE sip:81310000001@tokyo.sip.jp SIP/2.0
Via:SIP/2.0/UDP Tokyo.sip.jp:5060;branch=z9hG4bk776as3
From:81310000000@tokyo.sip.jp;tag=r18f061962
To:81310000001@tokyo.sip.jp

Fig.11

| Enum domain name | | Order | Preference | Flags | Service | | URI scheme | |
|---|---|---|---|---|---|---|---|---|
| | | | | | | | | URI |
| 0.0.0.0.0.0.0.1.3.1.8.e164.arpa | IN NAPTR | 100 | 10 | "u" | "E2U+sip" | "!^.*$!sip:" | 81310000000@tokyo.sip.jp" | |
| | IN NAPTR | 100 | 10 | "u" | "E2U+ldap" | "!^.*$!ldap:" | //ldap.tokyo.ldap.com/user81310000000." | |
| 1.0.0.0.0.0.0.1.3.1.8.e164.arpa | IN NAPTR | 100 | 10 | "u" | "E2U+sip" | "!^.*$!sip:" | 81310000001@tokyo.sip.jp" | |
| | IN NAPTR | 100 | 10 | "u" | "E2U+ldap" | "!^.*$!ldap:" | //ldap.tokyo.ldap.com/user81310000001." | |

NAPTR resource record

IP TELEPHONE SYSTEM, IP TELEPHONE APPARATUS AND COMMUNICATIONS METHOD

BACKGROUND OF THE INVENTION

1. Field of the Invention

The present invention relates to an IP telephone system, an IP telephone apparatus and a communications method that perform voice communication via an IP network.

2. Description of Related Art

The recent rapid growth of the Internet has drawn attention to an IP telephone system that enables low-cost voice communications with telephone apparatuses at remote places as well as free voice communications between IP telephone apparatuses owned by subscribers. However, dishonest telemarketing agencies have been taking advantage of IP telephone systems using such low-cost or free communication services, causing a social problem.

Such unsolicited telemarketing calls may be blocked by using a caller identification function. For example, one possible countermeasure is to display, at a destination telephone apparatus, a telephone number of a source telephone apparatus, the telephone number of a source telephone apparatus being specified in header "From" in the "INVITE" message transmitted according to the SIP protocol. The SIP is a common call control protocol utilized in the IP telephone systems. This method allows users to screen out telephone calls from unidentified callers.

On the other hand, as an underlying technology, ENUM is emerging as the focus of attention. ENUM enables communications according to users' individual circumstances by effectively managing information used for diverse communications tools, including telephones, facsimiles, cellular phones and electronic mail. ENUM is designed to identify the Internet service with a unique global identification number such as the E.164 number, using the DNS (Domain Name System). Currently, the IETF (Internet Engineering Task force) is seeking to standardize ENUM platforms, where protocol specifications are discussed (See Publication 1, for example).

[Publication 1] Issued by ENUM Trial Japan "ENUM Trial Japan First Report" May, 2004

When using the above-described measure, however, it is necessary to ignore all calls from unidentified callers in order to avoid telemarketing calls. This results in a situation where communication cannot be established with any party who has called for the first time. As a result, a situation occurs where no communication can be established with parties that needed to be contacted, thus leading to the problem of no communication being allowed through such a telephone system.

SUMMARY OF THE INVENTION

The present invention is provided to address the above-described problems. The purpose of the present invention is to provide an IP telephone system, an IP telephone apparatus and a communications method that allow users to communicate safely with intentionally unblocked parties who have called for the first time while blocking unsolicited telemarketing calls, and that provide data to identify callers more easily than by checking callers' telephone numbers.

The present invention relates to an IP telephone system, an IP telephone apparatus, and an ENUM server. The IP telephone apparatus is connected to the IP network. The database server stores predetermined information regarding a user of a source IP telephone apparatus and transmits, to a destination IP telephone apparatus, the predetermined information in response to a request from the destination IP telephone apparatus. The ENUM server stores a NAPTR resource record which includes a URI utilized for obtaining the predetermined information stored in the database server. The ENUM server also transmits, to the destination IP telephone apparatus, a corresponding NAPTR resource record in response to a query from the destination IP telephone apparatus. In the IP telephone system, the IP telephone apparatus that received a call transmits, to the ENUM server, a query for a NAPTR resource record of the source IP telephone apparatus. The destination IP telephone apparatus transmits, to the database server, a request for the predetermined information regarding the user of the source IP telephone apparatus according to the obtained NAPTR resource record.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 5 illustrates an example of a NAPTR record stored in a DB of the ENUM server according to the first embodiment;

FIG. 6 illustrates an example of data stored in a DB of a DNS server according to the first embodiment;

FIG. 7 illustrates an example of data stored in a Web server according to the first embodiment;

FIG. 9 illustrates an example of the "INVITE" message transmitted from the source IP telephone apparatus to the destination IP telephone apparatus in the IP telephone system according to the first embodiment;

FIG. 11 illustrates an example of a NAPTR record stored in a DB of an ENUM server according to the second embodiment;

DETAILED DESCRIPTION OF PREFERRED EMBODIMENTS

The embodiments of the present invention are explained in the following, in reference to the above-described drawings.

First Embodiment

Figure 1:
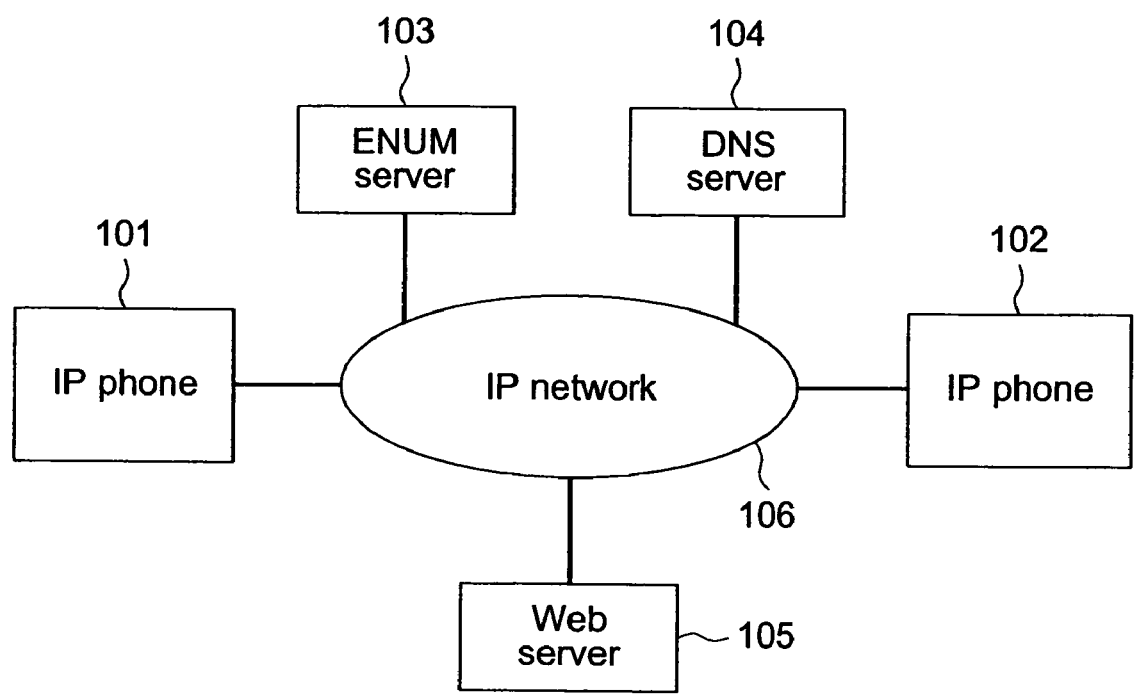
FIG. 1 illustrates a network configuration to which an IP telephone system according to the first embodiment of the present invention is applied.

FIG. 1 illustrates a network configuration to which an IP telephone system according to the first embodiment of the present invention is applied.

As shown in the figure, in the IP telephone system according to the present embodiment, a plurality of IP telephone apparatuses (hereafter referred to as "IP phone") 101, 102, ENUM server 103, DNS server 104 and Web server 105 as a database server are mutually connected via IP network 106. The IP telephone system is not limited to the embodiment shown in the figure and may be configured to connect three or more IP phones on IP network 106.

IP phone 101 (102) has a function enabling voice communication with another IP phone via IP network 106. IP phone 101 (102) also has a browsing function allowing users to access Web server 105 according to an http protocol and to read HTML texts provided by Web server 105.

ENUM server 103 is equipped with a database (DB) that stores a NAPTR resource record (hereafter referred to as "NAPTR record"), which is described later. ENUM server 103 transmits, to IP phone 101 (102), a NAPTR record stored in the DB in response to a query from IP phone 101 (102).

DNS server 104 is equipped with a DB that stores a URI specified in a NAPTR record and an IP address corresponding to the URI. DNS server 104 transmits, to IP phone 101 (102), an IP address registered in the DB in response to a query from IP phone 101 (102).

Web server 105 is equipped with a DB that stores data to identify a caller of IP phone 101 (102), which is connected to IP network 106 (hereafter referred to as "caller information"). Caller information includes a telephone number (hereafter referred to as "caller number"), a name, an address, an email address and image data such as a photo of the caller's face. Caller information is not limited to individual information and may include a company's name, a telephone number, an address, an email address and an advertisement. Web server 105 transmits, to IP phone 101 (102), caller information stored in the DB in response to a request from IP phone 101 (102) that has received a call.

Figure 2:
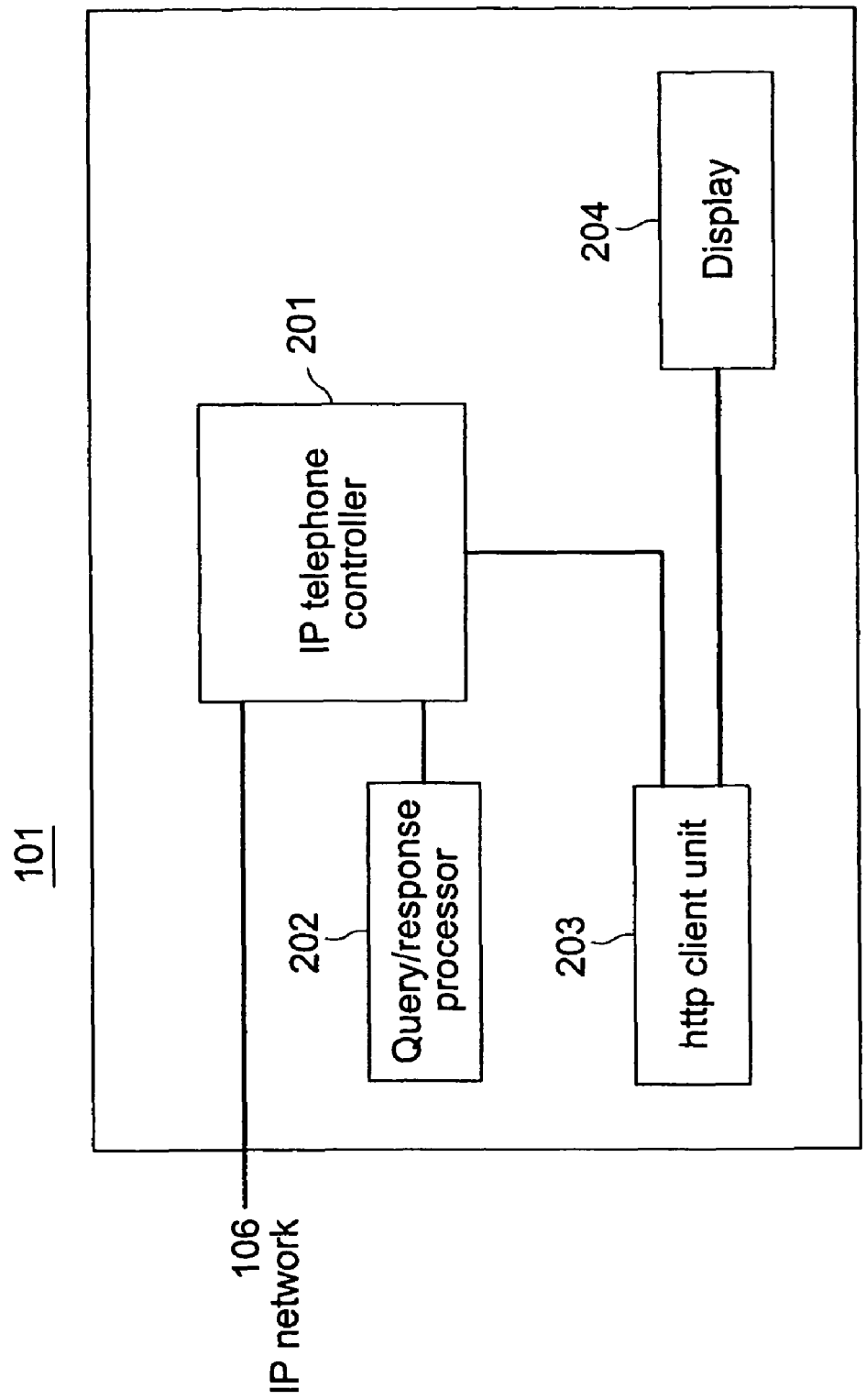
FIG. 2 illustrates a block diagram describing a configuration of an IP telephone apparatus that constitutes the IP telephone system according to the first embodiment.

FIG. 2 illustrates a block diagram describing a configuration of IP phone 101 according to the present embodiment. IP phone 102 has the same configuration as IP phone 101.

According to IP phone 101 shown in the figure, IP phone controller 201 controls all operations needed to perform voice communication via IP network 106. For example, IP phone controller 201 executes a call control with the destination terminal according to call control protocols such as a SIP or an H.323. IP phone controller 201 also provides necessary instructions to query/response processor 202 or http client unit 203 (described later).

Query/response processor 202 is used to transmit, to ENUM server 103, a query for a NAPTR record corresponding to the destination terminal (hereafter referred to as "ENUM query") and receive a response to the ENUM query (hereafter referred to as "ENUM response"). Query/response processor 202 is also used to transmit, to DNS server 103, a query for an IP address (hereafter referred to as "IP address query") and to control the reception of a response to the IP address query (hereafter referred to as "IP address response").

Http client unit 203 controls access to Web server 105 and a reading of HTML texts provided by Web server 105. Http client unit 203 also controls a display of HTML texts downloaded from Web server 105 on display 204.

Display 204 is configured with an LCD and the like. Display 204 displays the current status of IP phone 101 and displays input telephone numbers or other data. Display 204 also displays HTML texts downloaded from Web server 105 under the control of http client unit 203.

Figure 3:
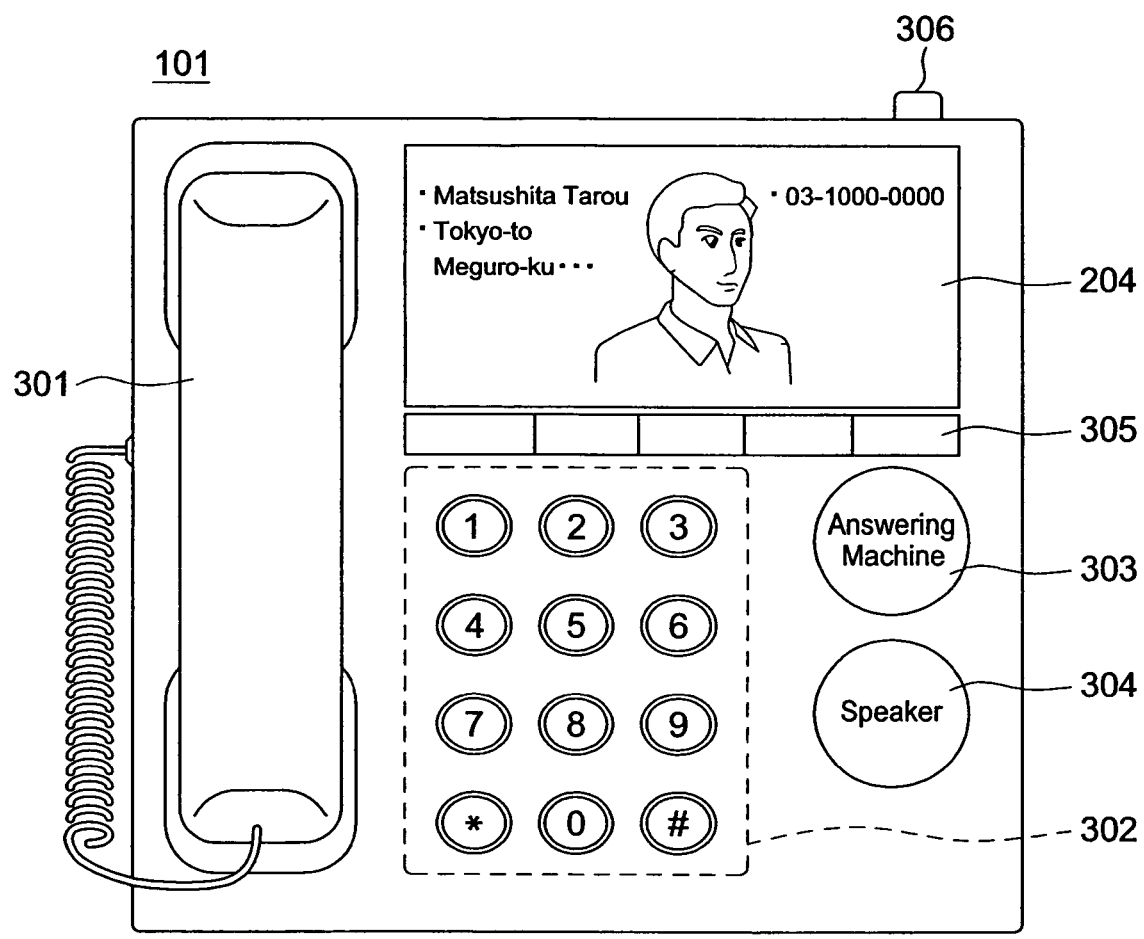
FIG. 3 illustrates the external front view of the IP telephone apparatus according to the first embodiment.

FIG. 3 illustrates the external front view of IP phone 101 according to the present embodiment. IP phone 102 has the same configuration as IP phone 101.

As shown in the figure, IP phone 101 is configured with receiver 301 that receives an operator's voice. IP phone 101 is also configured with numerical keys 302 that input telephone numbers or the like. IP phone 101 further includes, to the right side of numerical keys 302, AM (Answering Machine) button 303 and speaker button 304. AM button 303 is used to switch to the answering machine mode. Speaker button 304 is used to switch the mode to the external output voice. Function button 305 is located above numerical keys 302 and be able to set various functions such as a single touch transmission. IP phone 101 further includes, on its side, interface (LAN I/F) 306 to LAN which connects to IP network 106.

Display 204 is located above function button and be configured with an LCD or the like. Display 204 is used to display caller information (caller number or name) downloaded from Web server 105. Such display on display 204 is controlled in a process which is described later.

Figure 4:
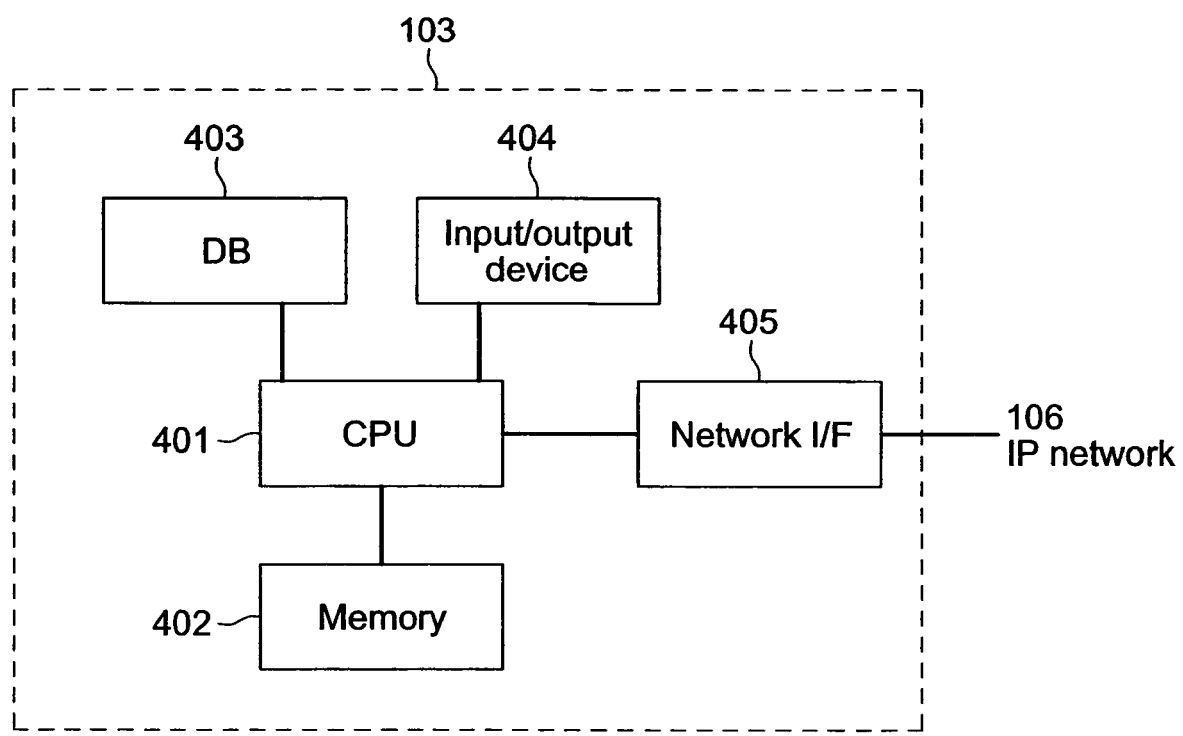
FIG. 4 illustrates a block diagram describing a typical configuration of an ENUM server in the IP telephone system according to the first embodiment.

FIG. 4 illustrates a block diagram describing a typical configuration of ENUM server 103 in the IP telephone system according to the present embodiment. DNS server 104 and Web server 105 in the IP telephone system according to the present embodiment have the same configuration as ENUM server 103 except they have different data stored in their DBs.

As shown in the figure, ENUM server 103 includes CPU 401 that controls the entire operation of the server. Memory 402 is connected to CPU 401. Memory 402 has ROM and RAM functions. The ROM stores such programs as a control program for ENUM server 103, which is retrieved and executed by CPU 401. The RAM functions as a work memory when CPU 401 executes the control program.

Database (DB) 403 is connected to CPU 401. DB 403 stores a NAPTR record, which is described later. Upon receiving an ENUM query from IP phone 101, for example, CPU 401 searches for a NAPTR record corresponding to the ENUM query from the data stored in DB 403. CPU 401 then transmits the corresponding NAPTR record to IP phone 101 that has transmitted the ENUM query.

Furthermore, input/output device 404 is connected to CPU 401. Input/output device 404 is configured with an input device such as a keyboard and an output device such as a display. The input device is used, for example, to add and edit the data stored in DB 403. The output device is used for administrators of ENUM server 103 to confirm the data stored in DB 403.

Furthermore, Network Interface (I/F) 405 is connected to CPU 401. Network I/F 405 is an interface to IP network 106 to which ENUM server 103 is connected.

FIG. 5 illustrates an example of a NAPTR record stored in DB 403 of ENUM server 103 according to the present embodiment. The figure shows a case where DB 403 stores NAPTR records corresponding to domain names obtained from telephone numbers "0310000000" and "0310000001".

In the figure, URIs "81310000000@tokyo.sip.jp" and "//www.tokyo.sip.com/user81310000000.html" correspond to domain name "0.0.0.0.0.0.0.1.3.1.8.e164.arpa" obtained from telephone number "0310000000". The service field of the first URI specifies "E2U+sip", which indicates that the terminal specified by "0310000000" is able to perform the SIP protocol. The service field of the second URI specifies "E2U+http", which indicates that the terminal specified by "0310000000" is able to perform the http protocol.

URIs "81310000001@tokyo.sip.jp" and "//www.tokyo.sip.com/user81310000001.html" correspond to domain name "1.0.0.0.0.0.0.1.3.1.8.e164.arpa" obtained from telephone number "0310000001". The service field of the first URI specifies "E2U+sip", which indicates that the terminal specified by "0310000001" is able to perform the SIP protocol. The service field of the second URI specifies "E2U+http", which indicates that the terminal specified by "0310000001" is able to perform the http protocol.

FIG. 6 illustrates an example of data stored in a DB of DNS server 104 according to the present embodiment.

The figure shows a case where the DB of DNS server 104 stores URIs "81310000000@tokyo.sip.jp", "81310000001 @tokyo.sip.jp", "81310000002@tokyo.sip.jp" and "81310000003@tokyo.sip.jp". More specifically, IP addresses "192.168.1.1", "192.168.1.2", "192.168.1.3" and "192.168.1.4" correspond to URIs "81310000000@tokyo.sip.jp", "81310000001@tokyo.sip.jp", "81310000002@tokyo.sip.jp" and "81310000003@tokyo.sip.jp" respectively.

FIG. 7 illustrates an example of data stored in Web server 105 according to the present embodiment.

FIG. 7 shows a case where Web server 105 stores "//www.tokyo.sip.com/user81310000000.html" and "//www.tokyo.sip.com/user81310000001.html". More specifically, URIs (URLs) "//www.tokyo.sip.com/user81310000000.html" and "//www.tokyo.sip.com/user81310000001.html" contain data such as the names, telephone numbers, addresses and image data of "Matsushita Tarou" and "Matsushita Hanako".

Figure 8:
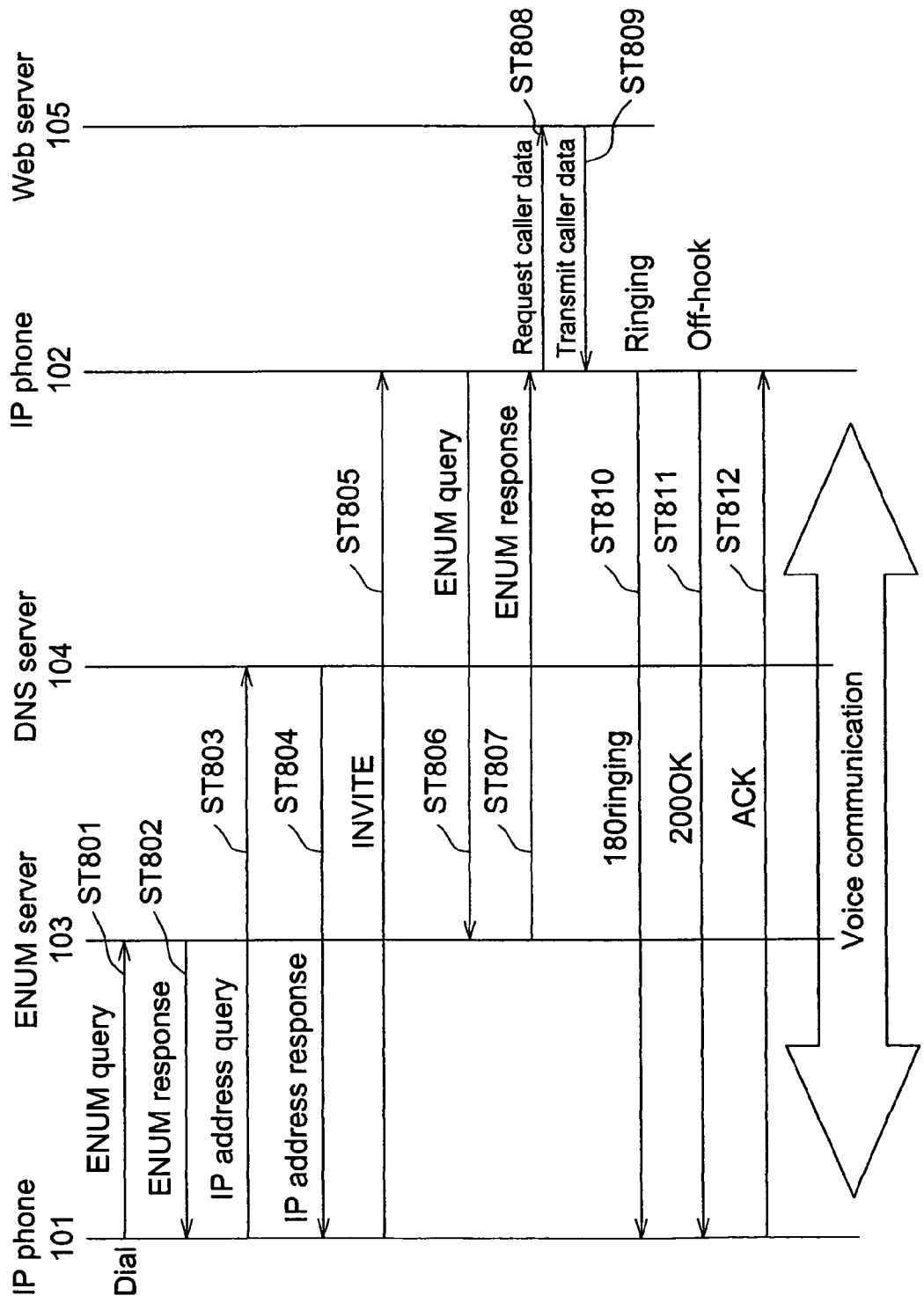
FIG. 8 illustrates a sequence diagram describing operations until a source IP telephone apparatus performs voice communication with a destination IP telephone apparatus in the IP telephone system according to the first embodiment.

The following describes the operations until IP phone 101 performs voice communication with IP phone 102 in the IP telephone system according to the present embodiment with reference to the FIG. 8 sequence diagram.

In this illustration, DB 403 of ENUM server 103 stores the NAPTR record shown in FIG. 5. The DB of DNS server 104 stores the data shown in FIG. 6. Web server 105 stores the data shown in FIG. 7. IP phones 101 and 102 have "0310000000" and "0310000001" as respective assigned telephone numbers. The operators of IP phones 101 and 102 are "Matsushita Tarou" and "Matsushita Hanako" respectively.

When IP phone 101 performs voice communication with IP phone 102, the operator (Matsushita Tarou) of IP phone 101 first inputs the telephone number of IP phone 102 and instructs to transmit the ENUM query. In this case, telephone number "0310000001" is input, after which a instruction for transmitting the ENUM query is made.

Upon receiving the telephone number and then the instruction for transmitting ENUM query, IP phone 101 transmits, to ENUM server 103, an ENUM query for a NAPTR record corresponding to the telephone number (ST 801). In this case, IP phone 101 first converts the operator's input telephone number "0310000001" into "+81-3-10000001" including the country code according to standard E. 164. Then, "+81310000001" is obtained, maintaining + at the beginning and the numbers. Then, non numerical symbols are deleted, and dots are inserted between the numbers, resulting in "8.1.3.1.0.0.0.0.0.0.1". Next, the numbers are reversed, and data string ".e164.arpa" is added at the end. As a result, domain name "1.0.0.0.0.0.0.1.3.1.8. e164.arpa" is obtained.

IP phone 101 then transmits, to ENUM server 103, the ENUM query for a NAPTR record corresponding to the domain name.

Upon receiving the ENUM query, ENUM server 103 searches for a NAPTR record corresponding to domain name "1.0.0.0.0.0.0.1.3.1.8. e164.arpa" and transmits, to IP phone 101, an ENUM response including the corresponding NAPTR record (ST 802). In this case, ENUM server 103 retrieves the bottom NAPTR record among the NAPTR records shown in FIG. 5 and transmits, to IP phone 101, the ENUM response including the NAPTR record. When the ENUM response is transmitted to IP phone 101, IP phone 101 is notified that IP phone 102 is able to perform the SIP protocol and the http protocol.

When IP phone 101 receives the ENUM response including the NAPTR record, IP phone 101 transmits, to DNS server 104, a query for an IP address corresponding to URI "81310000001@tokyo.sip.jp" specified in the NAPTR record, which indicates that the destination terminal is able to perform the SIP protocol (ST 803).

Upon receiving the IP address query, DNS server 104 searches for an IP address corresponding to the URI. DNS server 104 then transmits, to IP phone 101, an IP address response including the corresponding IP address (ST 804). In this case, DNS server 104 retrieves the second top IP address (192.168.1.2) among the IP addresses shown in FIG. 6 and transmits, to IP phone 101, the IP address response including the IP address.

Upon receiving the IP address response, IP phone 101 confirms the IP address assigned to IP phone 102. IP phone 101 then transmits the "INVITE" message to the IP address destination (ST 805).

The following describes an example of the "INVITE" message transmitted from IP phone 101 to IP phone 102.

FIG. 9 illustrates an example of the "INVITE" message transmitted from IP phone 101 to IP phone 102.

The "INVITE" message shown in the figure includes header "From" in the third line and header "To" in the forth line. Header "From" contains data including the telephone number of the source IP phone 101, which is "81310000000". Header "To" contains data including the telephone number of the destination IP phone 102, which is "81310000001".

Particularly, in the example shown in FIG. 9, @ is contained in header "From" and header "To". Before @ (to the left side of @ in the figure), the telephone numbers of the source and destination IP phones are described. Data contained in header "From" and header "To" is not limited to the example shown in the figure.

Upon receiving the "INVITE" message from IP phone 101, IP phone 102 retrieves, from header "From" in the "INVITE" message, the telephone number of the source IP phone 101. In this case, "81310000000" described before @ is extracted from header "From" shown in FIG. 9 as the telephone number of the source IP phone 101. When the telephone number is registered in the phonebook of IP phone 102, IP phone 102 displays, on display 204, information (e.g., names) registered in the phonebook data of IP phone 102. The following describes a case in which there is no data registered in the phone book.

IP phone 102 transmits, to ENUM server 103, an ENUM query for a NAPTR record corresponding to the telephone number in the same manner as IP phone 101 that has received the input telephone number (ST 806). In this case, IP phone 102 first converts telephone number "81310000000", which is extracted from the "INVITE" message, into "8.1.3.1.0.0.0.0.0.0.0" with dots inserted between the numbers. Next, the numbers are reversed, and data string ".e164.arpa" is added at the end. As a result, domain name "0.0.0.0.0.0.0.1.3.1.8. e164.arpa" is obtained. IP phone 101 then transmits the ENUM query for a NAPTR record corresponding to the domain name.

Upon receiving the ENUM query, ENUM server 103 searches for a NAPTR record corresponding to domain name "0.0.0.0.0.0.0.1.3.1.8. e164.arpa" and then transmits, to IP phone 102, an ENUM response including the corresponding NAPTR record (ST 807). In this case, ENUM server 103 retrieves the top NAPTR record among the NAPTR records shown in FIG. 5 and transmits, to IP phone 102, the ENUM response including the NAPTR record. When the ENUM response is transmitted to IP phone 102, IP phone 102 is notified that IP phone 101 is able to perform the SIP protocol and the http protocol.

Upon receiving the ENUM response including the NAPTR record, IP phone 102 accesses Web server 105 based on URI "//www.tokyo.sip.com/user81310000000.html" specified in the NAPTR record, which indicates that the destination terminal is able to perform the http protocol, and requests information regarding the user of the source IP phone 101 (hereafter referred to as "caller information") (ST 808). In response to the request, Web server 105 transmits caller information to IP phone 102 (ST 809). In this case, Web server 105 transmits caller information such as "Matsushita Tarou" shown in FIG. 7.

When the caller information is received, it is displayed on display 204 of IP phone 102. Therefore, the operator of IP phone 102 becomes to be able to determine whether to respond to the call after checking the caller information displayed on display 204. IP phone 102 also sounds a ringing tone at the same time as displaying the caller information. At the same time, IP phone 102 transmits, to IP phone 101, the "180 Ringing" message (ST 810).

When an off-hook operation is detected at IP phone 102, IP phone 102 transmits, to IP phone 101, the "200 OK" message indicating a connection approval (ST 811). Upon receiving the "200 OK" message, IP phone 101 transmits the "ACK" message to IP phone 102 (ST 812). When IP phone 102 receives the "ACK" message, voice communication becomes possible between IP phone 101 and IP phone 102.

Figure 10:
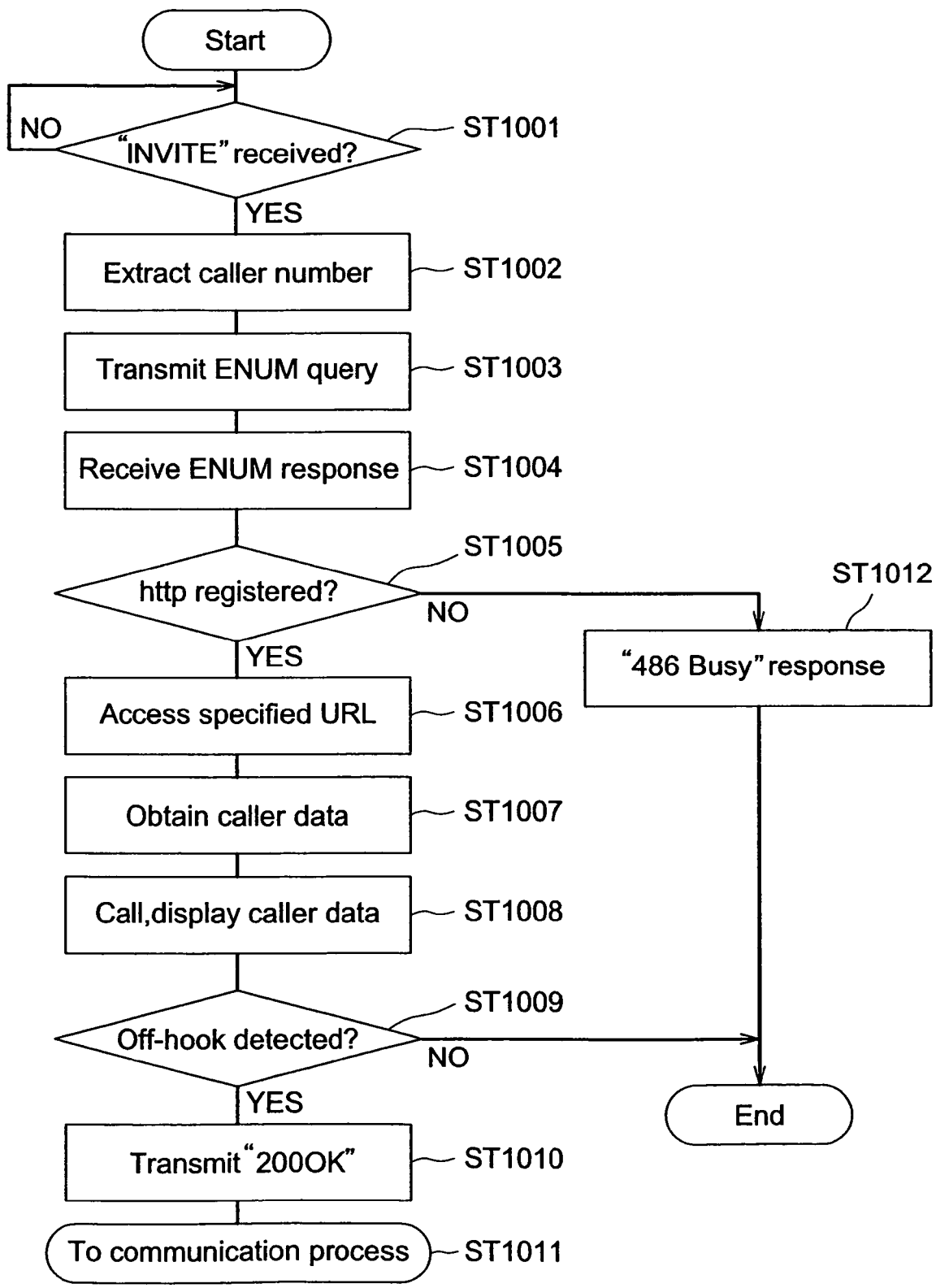
FIG. 10 illustrates a flow chart describing an operation of the destination IP telephone apparatus in the FIG. 8 sequence.

FIG. 10 illustrates a flow chart describing an operation of the destination IP phone 102 in the FIG. 8 sequence.

IP phone 102 monitors, in a standby state, for the reception of the "INVITE" message via IP network 105 (ST 1001). When the "INVITE" message is received, IP phone 102 extracts, from header "From" in the "INVITE" message, the caller number (ST 1002).

When the caller number is extracted, IP phone 102 transmit, to ENUM server 103, an ENUM query for a NAPTR record corresponding to the caller number (ST 1003). ENUM server 103 transmits, to IP phone 102, an ENUM response in response to the ENUM query, and IP phone 102 receives the ENUM response (ST 1004).

Upon receiving the ENUM response, IP phone 102 determines whether the NAPTR records in the ENUM response include the NAPTR record indicating that IP phone 101 is able to perform the http protocol (ST 1005).

When the NAPTR record indicating that IP phone 101 is able to perform the http protocol is included, IP phone 102 accesses Web server 105 according to the URI (URL) specified in the NAPTR record and requests caller information (ST 1006). Web server 105 transmits, to IP phone 102, the caller information in response to the request, and IP phone 102 obtains the caller information (ST 1007).

Upon obtaining the caller information, IP phone 102 displays the caller information on display 204 at the same time as sounding a ringing tone (ST 1008). IP phone 102 then determines whether the operator's on-hook operation is detected (ST 1009).

When the off-hook operation is detected, IP phone 102 transmits, to the source IP phone 101, the "200 OK" message indicating a connection approval (ST 1010). When IP phone 102 receives the "ACK" message transmitted from IP phone 101 in response to the "200 OK" message, the process proceeds to a talk process (ST 1011).

When it is determined in ST 1005 that there is no NAPTR record indicating that IP phone 101 is able to perform the http protocol, IP phone 102 transmits, to the source IP phone 101, the "486 BUSY" message indicating that no connection can be established (ST 1012) and terminates the process. When receiving the "486 BUSY" message, the source IP phone 101 determines that the communication was unsuccessful and terminates the process.

On the other hand, when it is determined in ST 1009 that no off-hook operation is detected, IP phone 102 determines, after waiting for a predetermined time, that the operator has no intention to respond to the call and terminates the process. The source IP phone 101 determines that the communication was unsuccessful because it is not able to receive, during an allocated time, the "200 OK" message indicating a connection approval and terminates the call process.

According to the IP telephone system of the present embodiment, Web server 105 transmits the caller information regarding the source IP phone 101 in response to a request from IP phone 102 that has received a call. The caller information is displayed on display 204 of IP phone 102 in order to present the caller information regarding IP phone 101 to the operator of the destination IP phone 102. This enables the operator of IP phone 102 to determine whether to respond to the call after confirming the caller information. As a result, the IP telephone system allows users to communicate safely with intentionally unblocked first-time callers while blocking unsolicited telemarketing calls.

Particularly, in the IP telephone system according to the present embodiment, IP phone 102 transmits, to Web server 105, a request for caller information according to the http protocol after receiving a call and obtains the caller information. Therefore, the caller information regarding IP phone 101 can be obtained by performing a communication control according to the http protocol.

When the http protocol is not specified in the service field of the NAPTR record transmitted from ENUM server 103, a connection to the source IP phone 101 is denied (ST 1012). This process can automatically reject calls from an IP telephone apparatus that does not specify the http protocol in the NAPTR record stored in ENUM server 103.

Second Embodiment

In the above-described IP telephone system according to the present embodiment, it is possible to modify a configuration that connects an IP telephone apparatus to IP network 106 or to use different protocols when the destination IP phone 102 requests caller information from Web server 105. The following describes an IP telephone system according to the second embodiment of the present invention.

The IP telephone system according to the first embodiment is described as a case in which the destination IP phone 102 transmits, to Web server 106, a request for caller information according to the http protocol. However, the method for obtaining caller information is not limited to requesting caller information from Web server 106 according to the http protocol. For example, the IP telephone system may be configured to request caller information from a database server that is separately provided, using an LDAP (Lightweight Directory Access Protocol) or an FTP (File Transfer Protocol).

FIG. 11 illustrates an example of a NAPTR record stored in DB 403 of ENUM server 103 according to the second embodiment of the present invention.

The NAPTR record shown in FIG. 11 differs from the NAPTR record shown in FIG. 5 in that it has different data in the service field and the URI scheme. More specifically, the NAPTR record in FIG. 11 specifies the LDAP instead of the http in the service field and the URI scheme.

Even when DB 403 of ENUM server 103 stores the NAPTR record shown in FIG. 11, the destination IP phone 102 is able to request caller information from the database server using the LDAP. This enables the operator to determine whether to respond to the call according to the caller information. As a result, the IP telephone system according to the second embodiment can provide the same advantages as the IP telephone system according to the first embodiment.

The IP telephone system according to the first embodiment is described as a case in which IP phone 101 obtains a URI from ENUM server 103 and an IP address from DNS server 104, and then transmits the "INVITE" message to IP phone 102. When transmitting the "INVITE" message, IP phone 101 may be configured to transmit the "INVITE" message via a CA (Call Agent) provided on IP network 106. In this case, IP phone 101 does not need to obtain information such as a URI from ENUM server 103 or an IP address from DNS server 104, since the CA performs a call control between IP phones 101 and 102.

Figure 12:
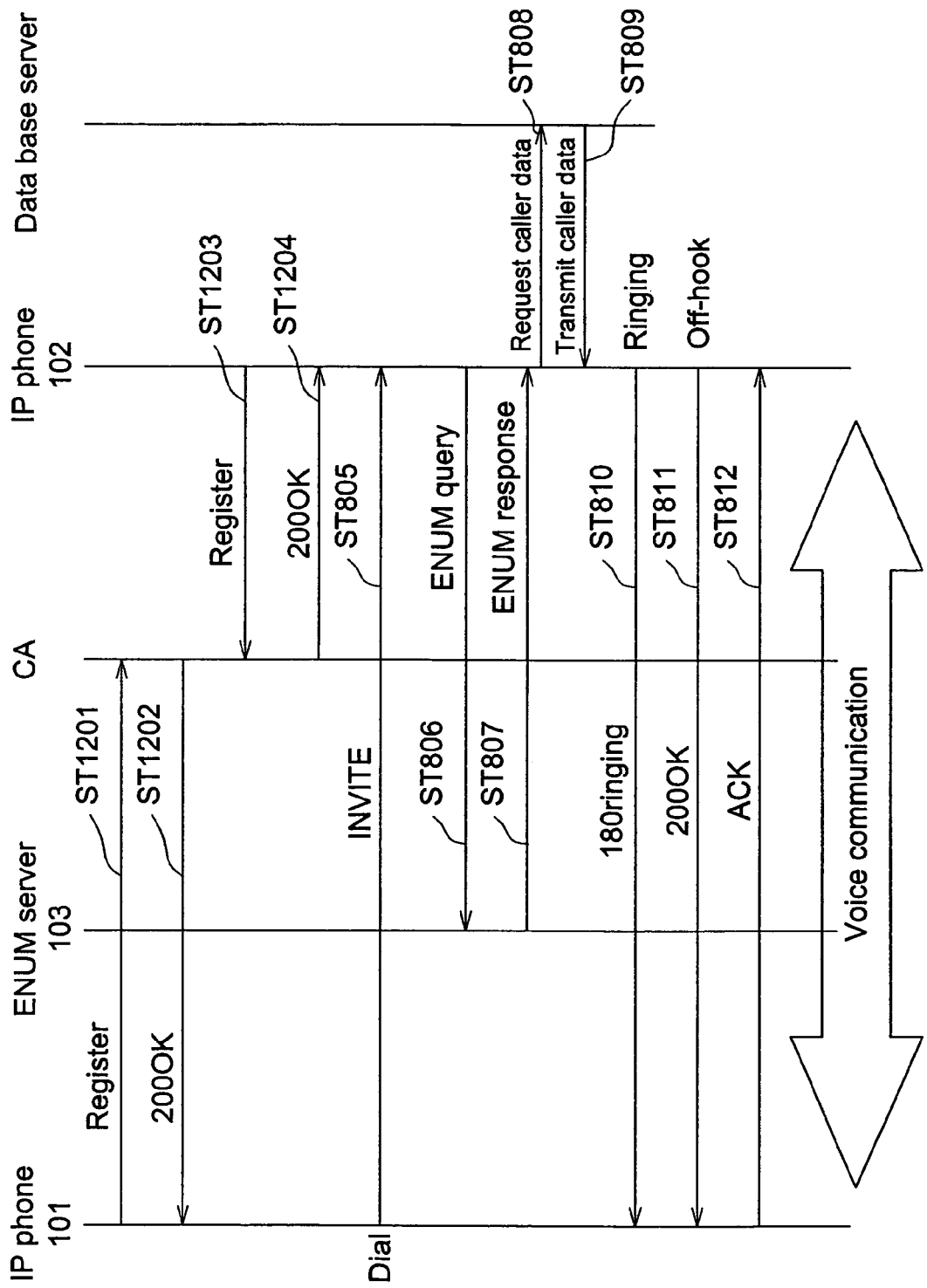
FIG. 12 illustrates a sequence diagram describing operations until a source IP telephone apparatus performs voice communication with a destination IP telephone apparatus in the IP telephone system according to the second embodiment.

FIG. 12 illustrates a sequence diagram describing operations until IP phone 101 performs voice communication with IP phone 102 in the IP telephone system according to the second embodiment.

The FIG. 12 sequence diagram differs from the FIG. 8 sequence diagram up to the process of transmitting the "INVITE" message from IP phone 101 to IP phone 102.

Individual IP telephone information need to be stored so that the CA can perform the call control between IP phones 101 and 102 on IP network 106. Therefore, as shown in FIG. 12, IP phone 101 needs to transmit the "Register" message to the CA, and the CA needs to returns the "200 OK" message to IP phone 101 (ST 1201, ST 1202). Similarly, IP phone 102 needs to transmit the "Register" message to the CA, and the CA needs to returns the "200 OK" message to IP phone 102 (ST 1203, ST 1204).

When the CA stores information regarding each IP telephone, the process is not limited to a case where IP phone 101 first stores information as shown in FIG. 12. In a reverse configuration from FIG. 12, it is possible to have IP phone 102 first store information.

When information for each IP telephone apparatus is stored as described above, IP phone 101 is able to transmit, to IP phone 102, the "INVITE" message via the CA using the telephone number of IP phone 102. When receiving the "INVITE" message, IP phone 102 obtains caller information as described in ST 806-ST 809. The operator is able to determine whether to respond to the call according to the caller information, which provides the same advantages as the IP telephone system according to the first embodiment of the present invention.

Furthermore, the IP telephone system of the first and second embodiments are described as a case in which a call control is performed between IP phones 101 and 102 according to the SIP protocol. However, the call control between IP phones 101 and 102 is not limited to the operation performed according to the SIP protocol and may be performed according to other protocols. For example, the call control may be performed between IP phones 101 and 102 according to the H.323 protocol or an MGCP (Media Gateway Control Protocol).

Third Embodiment

Figure 13:
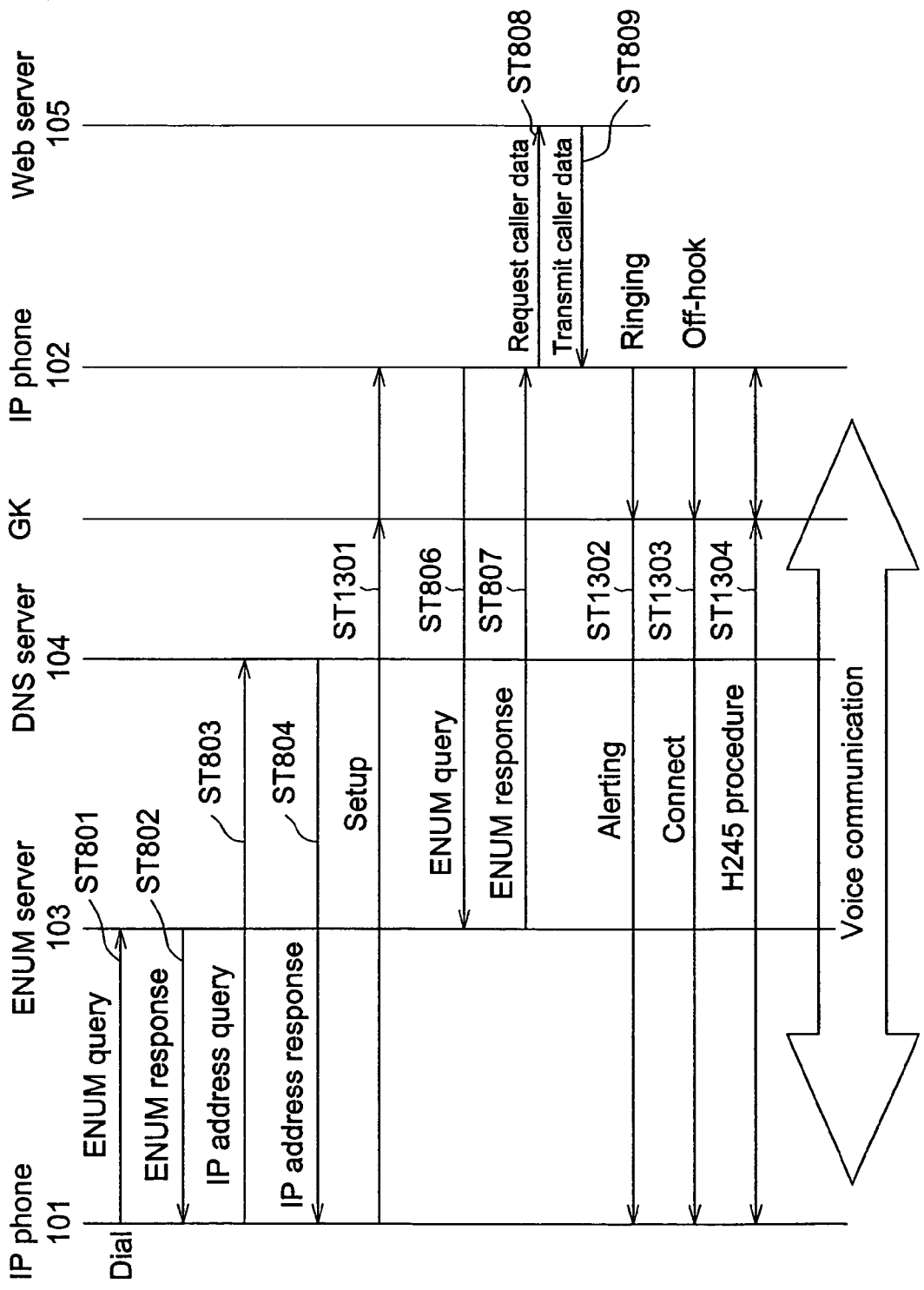
FIG. 13 illustrates a sequence diagram describing operations until a source IP telephone apparatus performs voice communication with a destination IP telephone apparatus in the IP telephone system according to the third embodiment.

FIG. 13 illustrates a sequence diagram describing operations until IP phone 101 performs communication with IP phone 102 in the IP telephone system according to the third embodiment of the present invention.

FIG. 13 differs from the FIG. 8 sequence diagram in that messages used in the call control operation performed between IP phones 101 and 102 are communicated via a gatekeeper (GK).

Upon receiving the IP address response as shown in FIG. 13, IP phone 101 transmit, to IP phone 102, the "SETUP" message via the GK (ST 1301). Also, when receiving caller information from Web server 105, IP phone 102 transmits, to IP phone 101, the "Alerting" message via the GK (ST 1302). Furthermore, when detecting the off-hook operation, IP phone 102 transmits, to IP phone 101, the "Connect" message via the GK (ST 1303). When IP phone 101 receives the "Connect" message, negotiations according to the H.245 procedure take place between IP phones 101 and 102 via the GK (ST 1304), after which voice communication becomes possible.

Figure 14:
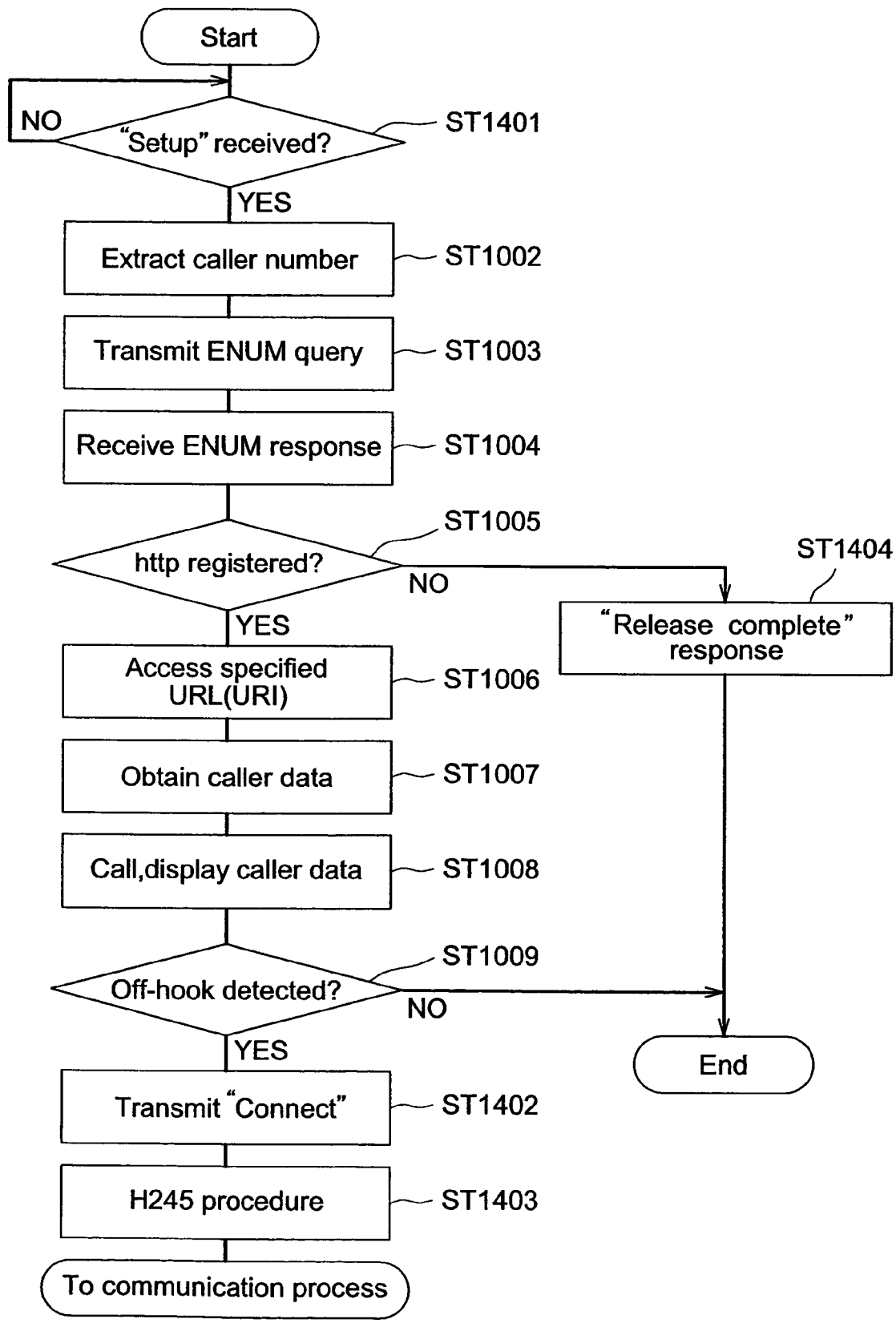
FIG. 14 illustrates a flow chart describing an operation of the destination IP telephone apparatus in the FIG. 13 sequence.

FIG. 14 illustrates a flow chart describing an operation of the destination IP phone 102 in the FIG. 13 sequence.

The FIG. 14 sequence differs from the FIG. 10 operating sequence in that IP phone 101 in FIG. 14 monitors for the reception of the "SETUP" message instead of the "INVITE" message (ST 1401), that the "Connect" message instead of the "200 OK" message is transmitted when the operator's off-hook operation is detected (ST 1402), that negotiations according to the H.245 procedure take place after the "Connect" message is transmitted (ST 1403), and that the "Release Complete" message is transmitted when it is determined in ST 1005 that there is no NAPTR record indicating that the destination terminal is able to perform the http protocol (ST 1404).

As described above, when the call control according to the H.323 protocol is performed between IP phones 101 and 102, upon receiving the "SETUP" message, IP phone 102 obtains caller information in the same manner as ST 806-ST 809 (ST 1002-ST 1007). The operator then becomes able to determine whether to respond to the call according to the caller information, which provides the same advantages as the IP telephone system according to the first and second embodiments of the present invention.

In the IP telephone system according to the embodiments, the voice is not limited to the human voice. It also includes sounds in general, for example, modem signals modulated to voice bands and fax signals. Also, the telephone can be a fax apparatus as well.

Furthermore, in the IP telephone system according to the embodiments, the IP phone is described as a single device. However, the embodiments are not limited to this case. In other words, the IP phone can be configured by connecting an ordinary telephone apparatus to a control adapter that has a function which uses the connected ordinary telephone apparatus as an IP phone. In this illustration, the ordinary telephone apparatus is a telephone apparatus that has no voice communication functions via IP network 106.

The IP telephone described above includes an IP telephone defined by the government and operated by a telecommunications provider. It also includes an IP telephone provided on a local network or a private network using TCP/IP or other computer network protocols.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2004-211618 filed on Jul. 20, 2004 entire content of which is expressly incorporated by reference herein.

What is claimed is:

1. An IP telephone system comprising:
 a calling IP telephone apparatus and a called IP telephone apparatus;
 a Web server configured to store predetermined information regarding a user of the calling IP telephone apparatus, corresponding to a predetermined URI; and
 an ENUM server configured to store a NAPTR (Naming Authority Pointer) resource record, the NAPTR resource record including an ENUM domain name corresponding to the predetermined URI stored in the Web server and a protocol corresponding to the predetermined URI;
 the called IP telephone apparatus, comprising:
  a display configured to display data; and
  a controller configured to:
   receive, from the calling IP telephone apparatus, a predetermined message command for a connection with the called IP telephone apparatus, the predetermined message command including a telephone number of the calling IP telephone apparatus;
   extract the telephone number of the calling IP telephone apparatus from the predetermined message command received from the calling IP telephone apparatus;
   generate an ENUM domain name based on the telephone number of the calling IP telephone apparatus extracted from the predetermined message command received from the calling IP telephone apparatus;
   transmit, to the ENUM server, a request for transmitting, to the called IP telephone apparatus, the NAPTR resource record including the ENUM domain name generated based on the telephone number of calling IP telephone apparatus;
   receive, from the ENUM server, the NAPTR resource record including the ENUM domain name generated based on the telephone number of calling IP telephone apparatus;
   determine whether the protocol included in the received NAPTR record indicates a predetermined protocol utilized for accessing the Web server;
   access the predetermined information regarding the user of the calling IP telephone apparatus stored in the Web server, based on the predetermined URI and the protocol included in the received NAPTR resource record, when it is determined that the protocol included in the received NAPTR record indicates the predetermined protocol;
   receive, from the Web server, the predetermined information regarding the user of the calling IP telephone apparatus corresponding to the predetermined URI;
   control the display of the called IP telephone apparatus to display the received predetermined information regarding the user of the calling IP telephone apparatus; and
   sound a ringing tone at the called IP telephone apparatus while displaying the received predetermined information regarding the user of the calling IP telephone apparatus.

2. The IP telephone system according to claim 1, wherein the predetermined information regarding the user of the calling IP telephone apparatus comprises one of a telephone number of the calling IP telephone apparatus, a name of the user, an address of the user, an e-mail address of the user, and photo data representing a face of the user.

3. The IP telephone system according to claim 1, wherein the predetermined message command comprises an INVITE message specified in a SIP protocol, and the controller of the called IP telephone apparatus extracts the telephone number of the calling IP telephone apparatus from a header of the INVITE message.

4. The IP telephone system according to claim 1, wherein the predetermined message command comprises a SETUP message specified in a H.323 protocol.

5. The IP telephone system according to claim 1, wherein, when the controller of the called IP telephone apparatus determines that the protocol included in the received NAPTR resource record does not indicate the predetermined protocol, the called IP telephone apparatus transmits, to the calling IP telephone apparatus, a message command indicating that the called IP telephone apparatus is unavailable and denies the connection between the calling IP telephone apparatus and the called IP telephone apparatus.

6. The IP telephone system according to claim 1, wherein the predetermined protocol comprises a HTTP protocol.

7. The IP telephone system according to claim 1, wherein the predetermined protocol comprises a LDAP protocol.

8. The IP system according to claim 1, wherein the called IP telephone apparatus includes a telephone book, and
 the controller of the called IP telephone apparatus further determines whether or not the extracted telephone number of the calling IP telephone apparatus is registered in the phonebook, and transmits, to the ENUM server, the request, when the extracted telephone number of the calling IP telephone apparatus is not registered in the phonebook.

9. A called IP telephone apparatus connected to a Web server and to an ENUM server, the Web server storing predetermined information regarding a user of a calling IP telephone apparatus corresponding to a predetermined URI, the ENUM server storing a NAPTR (Naming Authority Pointer) resource record, the NAPTR resource record including an ENUM domain name corresponding to the predetermined URI stored in the Web server and a protocol corresponding to the predetermined URI, the called IP telephone apparatus comprising:
- a display configured to display data; and
- a controller configured to:
  - receive, from the calling IP telephone apparatus, a predetermined message command for a connection with the called IP telephone apparatus, the predetermined message command including a telephone number of the calling IP telephone apparatus;
  - extract the telephone number of the calling IP telephone apparatus from the predetermined message command received from the calling IP telephone apparatus;
  - generate an ENUM domain name based on the telephone number of the calling IP telephone apparatus extracted from the predetermined message command received from the calling IP telephone apparatus;
  - transmit, to the ENUM server, a request for transmitting, to the called IP telephone apparatus, the NAPTR resource record including the ENUM domain name generated based on the telephone number of calling IP telephone apparatus;
  - receive, from the ENUM server, the NAPTR resource record including the ENUM domain name generated based on the telephone number of calling IP telephone apparatus;
  - determine whether the protocol included in the received NAPTR record indicates a predetermined protocol utilized for accessing the Web server;
  - access the predetermined information regarding the user of the calling IP telephone apparatus stored in the Web server, based on the predetermined URI and the protocol included in the received NAPTR resource record, when it is determined that the protocol included in the received NAPTR record indicates the predetermined protocol;
  - receive, from the Web server, the predetermined information regarding the user of the calling IP telephone apparatus corresponding to the predetermined URI;
  - control the display of the called IP telephone apparatus to display the received predetermined information regarding the user of the calling IP telephone apparatus; and
  - sound a ringing tone at the called IP telephone apparatus while displaying the received predetermined information regarding the user of the calling IP telephone apparatus.

10. The called IP telephone apparatus according to claim 9, wherein the predetermined information regarding the user of the calling IP telephone apparatus comprises one of a telephone number of the calling IP telephone apparatus, a name of the user, an address of the user, an e-mail address of the user, and photo data representing a face of the user.

11. The called IP telephone apparatus according to claim 9, wherein the predetermined message command comprises an INVITE message specified in a SIP protocol, and the controller extracts the telephone number of the calling IP telephone apparatus from a header of the INVITE message.

12. The called IP telephone apparatus according to claim 9, wherein the predetermined message command comprises a SETUP message specified in a H.323 protocol.

13. The called IP telephone apparatus according to claim 9, wherein, when the controller determines that the protocol included in the received NAPTR resource record does not indicate the predetermined protocol, the controller transmits, to the calling IP telephone apparatus, a message command indicating that the called IP telephone apparatus is unavailable and denies the connection between the calling IP telephone apparatus and the called IP telephone apparatus.

14. The called IP telephone apparatus according to claim 9, wherein the predetermined protocol comprises a HTTP protocol.

15. The called IP telephone apparatus according to claim 9, wherein the predetermined protocol comprises a LDAP protocol.

16. The called IP telephone apparatus according to claim 9, further comprising a phonebook,
- wherein the controller further determines whether or not the extracted telephone number of the calling IP telephone apparatus is registered in the phonebook, and transmits, to the ENUM server, the request, when the extracted telephone number of the calling IP telephone apparatus is not registered in the phonebook.

17. A method for communicating with a calling IP telephone apparatus via the Internet at a called IP telephone apparatus, the called IP telephone apparatus being connected to a Web server and to an ENUM server, the Web server storing predetermined information regarding a user of the calling IP telephone apparatus corresponding to a predetermined URI, the ENUM server storing a NAPTR (Naming Authority Pointer) resource record, the NAPTR resource record including an ENUM domain name corresponding to the predetermined URI stored in the Web server and including a protocol corresponding to the predetermined URI, the method comprising:
- receiving, from the calling IP telephone apparatus, a predetermined message command for a connection with the called IP telephone apparatus, the predetermined message command including a telephone number of the calling IP telephone apparatus;
- extracting the telephone number of the calling IP telephone apparatus from the predetermined message command received from the calling IP telephone apparatus;
- generating an ENUM domain name based on the telephone number of the calling IP telephone apparatus extracted from the predetermined message command received from the calling IP telephone apparatus;
- transmitting, to the ENUM server, a request for transmitting, to the called IP telephone apparatus, the NAPTR resource record including the ENUM domain name generated based on the telephone number of calling IP telephone apparatus;
- receiving, from the ENUM server, the NAPTR resource record including the ENUM domain name generated based on the telephone number of calling IP telephone apparatus;
- determining whether the protocol included in the received NAPTR record indicates a predetermined protocol utilized for accessing the Web server;
- accessing the predetermined information regarding the user of the calling IP telephone apparatus stored in the Web server, based on the predetermined URI and the protocol included in the received NAPTR resource record, when it is determined that the protocol included in the received NAPTR record indicates the predetermined protocol;
- receiving, from the Web server, the predetermined information regarding the user of the calling IP telephone apparatus corresponding to the predetermined URI;
- displaying the received predetermined information regarding the user of the calling IP telephone apparatus on the display of the called IP telephone apparatus; and
- sounding a ringing tone at the called IP telephone apparatus while displaying the received predetermined information on the display of the called IP telephone apparatus regarding the user of the calling IP telephone apparatus.

18. The method according to claim 17, wherein the predetermined information regarding the user of the calling IP telephone apparatus comprises one of a telephone number of the calling IP telephone apparatus, a name of the user, an address of the user, an e-mail address of the user, and photo data representing a face of the user.

19. The method according to claim 17 further comprising transmitting, to the calling IP telephone apparatus, a message command indicating that the called IP telephone apparatus is unavailable and denying the connection between the calling IP telephone apparatus and the called IP telephone apparatus, when the protocol included in the received NAPTR resource record does not indicate the predetermined protocol.

20. The method according to claim 17, wherein the called IP telephone apparatus further includes a phonebook, the method further comprising determining whether or not the extracted telephone number of the calling IP telephone apparatus is registered in the phonebook, and wherein the request is transmitted to the ENUM server, when the extracted telephone number of the calling IP telephone apparatus is not registered in the phonebook.

* * * * *